US008810399B2

(12) United States Patent
Forster

(10) Patent No.: US 8,810,399 B2
(45) Date of Patent: Aug. 19, 2014

(54) DETECTION OF GROUPS OF RFID TAGS

(75) Inventor: Ian J. Forster, Essex (GB)

(73) Assignee: Avery Dennison Corporation, Glendale, CA (US)

( * ) Notice: Subject to any disclaimer, the term of this patent is extended or adjusted under 35 U.S.C. 154(b) by 603 days.

(21) Appl. No.: 13/048,969

(22) Filed: Mar. 16, 2011

(65) Prior Publication Data
US 2012/0235817 A1  Sep. 20, 2012

(51) Int. Cl.
*G08B 13/14* (2006.01)
(52) U.S. Cl.
USPC .................. 340/572.1; 340/568.1; 340/572.4; 340/5.92
(58) Field of Classification Search
USPC .............. 340/572.1, 568.1, 572.4, 5.92, 10.1, 340/10.42; 235/385
See application file for complete search history.

(56) References Cited

U.S. PATENT DOCUMENTS

| 5,640,002 | A | 6/1997 | Ruppert et al. |
| 7,549,579 | B2 | 6/2009 | Overhultz et al. |
| 7,639,135 | B2* | 12/2009 | Arms et al. ................ 340/572.1 |
| 2006/0022815 | A1 | 2/2006 | Fischer et al. |
| 2006/0103534 | A1 | 5/2006 | Arms et al. |
| 2007/0100677 | A1 | 5/2007 | Boss et al. |
| 2008/0059297 | A1 | 3/2008 | Vallier et al. |
| 2008/0079584 | A1 | 4/2008 | Tabet et al. |
| 2009/0145965 | A1 | 6/2009 | Davis et al. |

FOREIGN PATENT DOCUMENTS

WO     2009/073198     6/2009

OTHER PUBLICATIONS

International Search Report dated Aug. 29, 2012 for International Application No. PCT/US2012/029166 filed Mar. 15, 2012.
Written Opinion dated Aug. 29, 2012 for International Application No. PCT/US2012/029166 filed Mar. 15, 2012.

* cited by examiner

*Primary Examiner* — Toan N Pham
(74) *Attorney, Agent, or Firm* — Avery Dennison Corporation

(57) ABSTRACT

RFID-based inventory management systems are provided for various applications. Such systems include a plurality of RFID-readable products tags, with each product tag being associated with a piece of merchandise and programmed to generate a signal containing information regarding the associated piece of merchandise. Such systems also include an RFID reader capable of sending and receiving signals from the product tags. Such systems further include a processor capable of receiving signals from the RFID reader with information regarding the product tags. The processor compares the information regarding two or more product tags to determine whether they are being moved together as part of a moving group. If the processor determines that there exists a moving group of product tags, it generates an output based at least in part on the signals being sent from the product tags in the moving group.

39 Claims, 5 Drawing Sheets

DETECTION OF GROUPS OF RFID TAGS

FIELD OF THE DISCLOSURE

The present subject matter relates to radio frequency identification ("RFID") devices. More particularly, the present subject matter relates to merchandise-mounted RFID tags and systems for detecting groups of RFID tags.

DESCRIPTION OF RELATED ART

It is known to employ RFID technology in an area (for example within a store or other retail environment) for various purposes. In one example, an RFID reader is associated with a point-of-sale location or check-out counter of a store and detects a tag associated with an item being purchased to register the price of the item. In another example, an RFID-readable tag or transponder is attached to each piece of merchandise in a store or storage area. The tags are scanned using an RFID reader to keep proper count of the product inventory. In yet another example, RFID technology is used as a security measure. In a typical RFID-based security system for a store, one or more RFID readers are installed adjacent to an exit, while guard tags are associated with (often by means of a hangtag or label) individual items sold in the store. When a customer purchases an item, the cashier will either remove or otherwise deactivate the guard tag associated therewith. If the guard tag has not been removed or deactivated (for example if a customer attempts to remove the item from the store without paying for it), the RFID reader or readers in the read field will sense the guard tag as the customer is exiting the store. Upon sensing the guard tag, the read field causes an alarm or other alert to trigger, thereby alerting store personnel to possible theft of the item.

Although the above-described systems are widespread and useful for tracking inventory and alerting store personnel to theft, there are a number of other functions that RFID systems could perform that would be advantageous, but are not presently performed by existing systems. For example, it would be beneficial to alert an employee that a customer needs assistance in moving merchandise from a display area to a checkout area. Further, it would be beneficial to alert store personnel of possible impending theft before merchandise has been removed from the store.

SUMMARY OF THE INVENTION

There are several aspects of the present subject matter which may be embodied separately or together in the devices and systems described and claimed below. These aspects may be employed alone or in combination with other aspects of the subject matter described herein, and the description of these aspects together is not intended to preclude the use of these aspects separately or the claiming of such aspects separately or in different combinations as may be set forth in the claims appended hereto.

In one aspect, an RFID-based inventory management system comprises a plurality of RFID-readable product tags, an RFID reader, and a processor. Each product tag is associated with a piece of merchandise and programmed to generate a signal containing information regarding the associated piece of merchandise. The RFID reader is capable of sending signals to and receiving signals from the product tags. The processor is capable of receiving signals from the RFID reader with information regarding the product tags. The processor is programmed to compare the information regarding two or more product tags to determine whether they are being moved together as part of a moving group. If the product tags are part of a moving group, the processor generates an output based at least in part on the signals being sent from the product tags in the moving group.

In another aspect, an RFID-based method is provided for managing inventory. The method involves providing a plurality of pieces of merchandise and a plurality of RFID-readable product tags, with each product tag associated with one of the pieces of merchandise and capable of generating a signal containing information regarding the associated piece of merchandise. The signals from two or more of the product tags are received and processed to determine whether the product tags are part of a moving group being moved together. If it is determined that the product tags are part of a moving group, an output is generated.

DESCRIPTION OF THE ILLUSTRATED EMBODIMENTS

As required, detailed embodiments of the present invention are disclosed herein; however, it is to be understood that the disclosed embodiments are merely exemplary of the invention, which may be embodied in various forms. Therefore, specific details disclosed herein are not to be interpreted as limiting, but merely as a basis for the claims and as a representative basis for teaching one skilled in the art to variously employ the present invention in virtually any appropriate manner.

Figure 1:
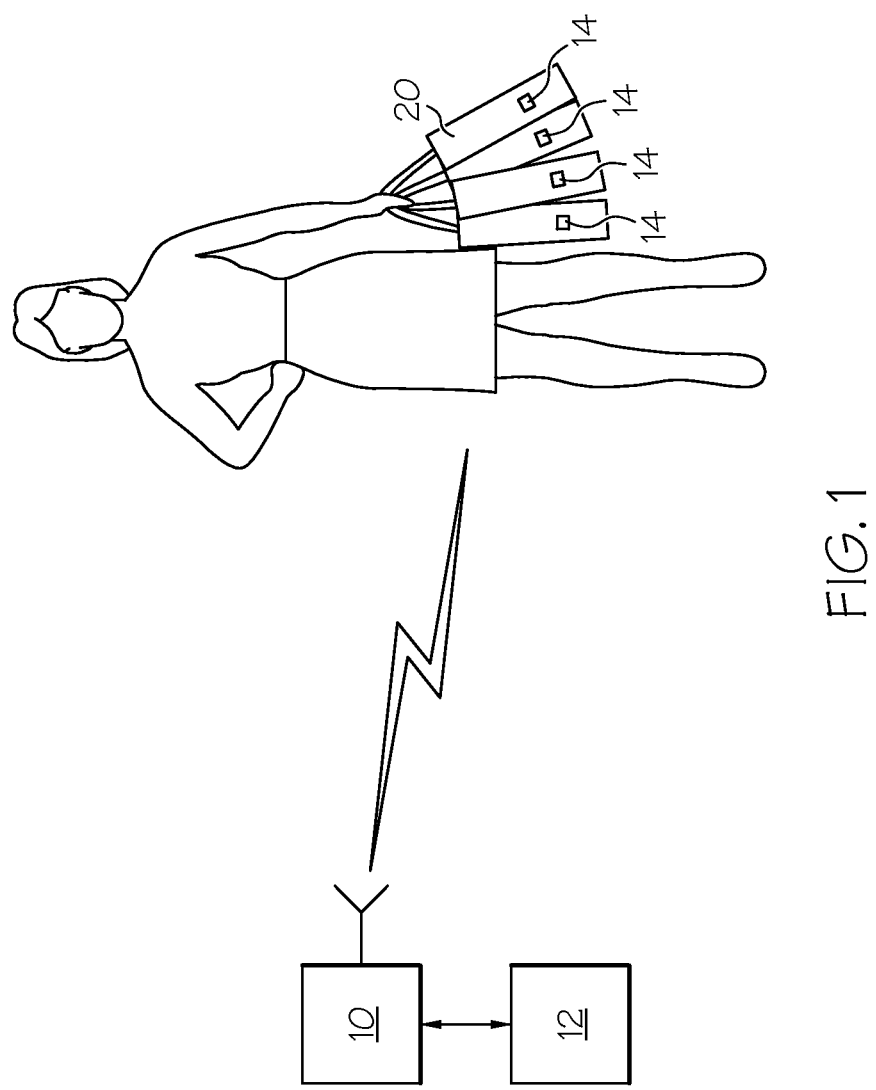
FIG. 1 is a schematic diagram of an RFID-based inventory management system for identifying a moving group of RFID-readable tags.
Figure 2:
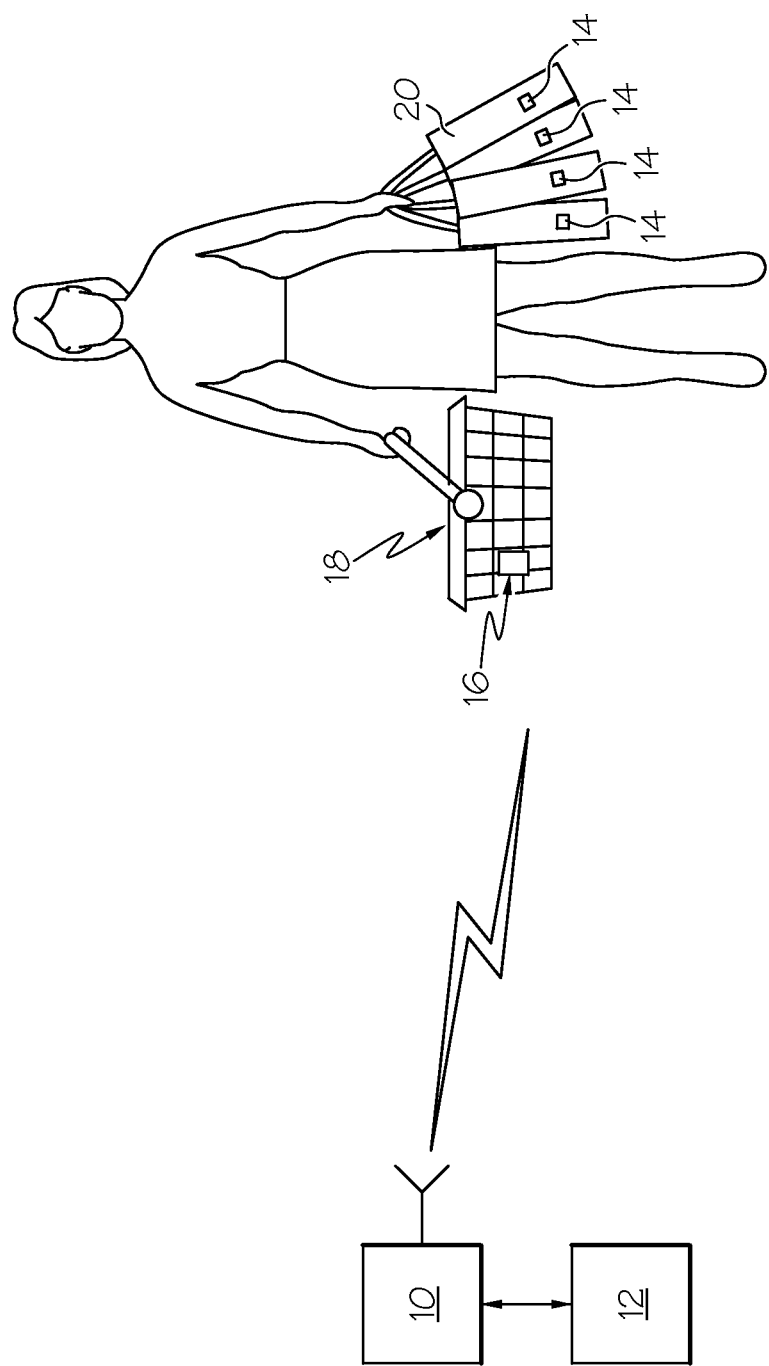
FIG. 2 is a schematic diagram of the RFID-based inventory management system of FIG. 1, with a shopper assistance device incorporating an additional RFID-readable tag.

FIGS. 1 and 2 illustrate an RFID-based inventory management system according to the present disclosure. The system comprises an RFID reader 10, a processor 12 associated with the RFID reader 10, and a plurality of RFID-readable product tags 14. In the embodiment of FIG. 2, the system further includes an RFID-readable assistance device tag 16 associated with an assistance device 18, which will be described in greater detail herein.

The fundamentals of RFID technology and the use thereof for inventory tracking and management is well known and will not be described in detail herein. In brief, each piece of merchandise 20 is provided with an associated product tag 14, which is detectable and readable by the RFID reader 10. The product tags 14 may be associated with the merchandise 20 by any of a number of means, such as a hang card or an adhesive material. Each product tag 14 contains information regarding the associated piece of merchandise 20, such as its SKU and/or price or other information of interest to the user. The product tags 14 may contain only a generic, non unique code associated with a type of item, a unique code that is associated with an item in a database or a combination of generic and unique codes. The RFID reader 10 is installed at a location in the store where it is advantageous to know whether a piece of merchandise 20 is present. This may be a wide variety of locations, including a stockroom or inventory storage area (to determine the available quantity of a given piece of merchandise 20) or at the exit of the store (to prevent theft of a piece of merchandise 20). In systems according to the present disclosure, it may be advantageous (for reasons to be described in greater detail below) for an RFID reader 10 to be installed such that its signal covers the area in which a shopper would be carrying or otherwise moving a piece of inventory 20 prior to checkout. For example, it may be preferred for an RFID reader 10 to be installed and configured so as to monitor a showroom or "floor" space of the store (i.e., the location between an inventory display area and a checkout location), although an RFID reader 10 may be installed at a different location without departing from the scope of the present disclosure.

The RFID reader 10 determines the presence of a piece of merchandise 20 by emitting a signal. Any product tags 14 within the range of the signal will send a return signal to the RFID reader 10, with the signal sent by the product tags 14 containing the product information encoded thereon. The RFID reader 10 receives the signal/information from the product tags 14 within its range and transmits the signal/information to the processor 12. The processor 12 may be integrated with the RFID reader 10 or it may be a separate, remote unit. Further, while FIGS. 1 and 2 show a single RFID reader 10 and processor 12, inventory management systems according to the present disclosure may incorporate a number of RFID readers 10 and a number of processors 12.

The processor 12 analyzes the signal/information from the RFID reader 10 and compares it to other signals from the same RFID reader 10 or from one or more other RFID readers 10. Most advantageously, each RFID reader 10 is capable of receiving signals from multiple product tags 14 simultaneously and transmitting such signals/information to the processor 12 simultaneously. The RFID reader 10 may continuously or periodically send signals/information to the processor 12 regarding product tags 14 within its range. The processor 12 compares the signals/information to each other and may also monitor any change in the individual signals over time to determine whether there are product tags 14 (and, hence, pieces of merchandise 20) present in a moving group. As used herein, the term "moving group" refers to two or more pieces of merchandise 20 and the associated product tags 14 which are being moved through a store together (as opposed to a group of pieces of merchandise 20 which are stationary, for example at a display location).

Figure 3:
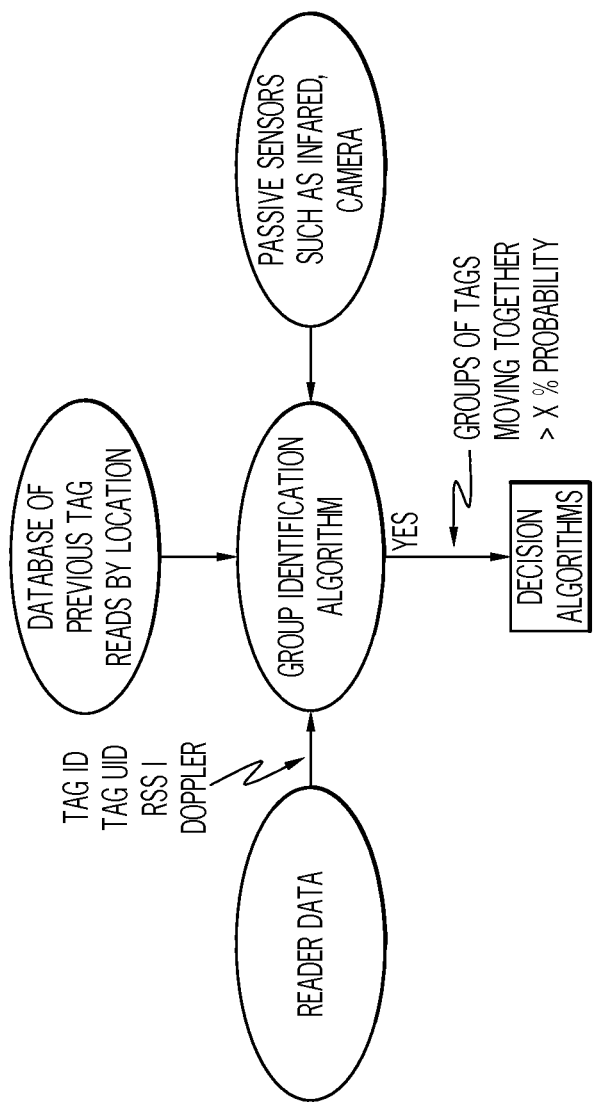
FIG. 3 is a schematic diagram of the control process used by the RFID-based inventory management system of FIG. 1 to identify a moving group of RFID-readable tags.

The processor 12 may identify a moving group by any of a number of means, but FIG. 3 illustrates one exemplary control process by which the processor 12 identifies a moving group. The processor 12 receives the signals/information from the RFID reader(s) 10 and analyzes the signals/information to compile data related to each product tag 14 and associated piece of merchandise 20. By a single measurement, the processor 12 may determine a number of things about the product tag 14, including the strength of the signal (received signal strength indicator or "RSSI"), the time at which the product tag 14 entered the range of the RFID reader 10, and the basic information encoded within the signal (for example SKU and/or price). The processor 12 stores the data in a database while the RFID reader 10 continues transmitting signals thereto, which the processor 12 analyzes and compares to the stored data.

By comparing signals over time, the processor 12 may determine whether an individual product tag 14 is being moved through the space monitored by the RFID reader 10 (which may be determined, for example, by a change in RSSI, Doppler shift, and/or phase shift). The processor 12 may then compare the movement of one product tag 14 to another product tag 14 to determine whether they are sufficiently similar that the probability of them being carried or moved by a shopper exceeds a threshold value. If the similarity exceeds the threshold value, then the processor 12 has determined that the product tags 14 are part of a moving group. The processor 12 may compare any of a number of factors (for example the approximate velocity and/or approximate direction of movement) to assess the similarity of the movement of the various product tags 14.

Additionally, the processor 12 may consider information from other areas (or other processors), which may inform the processor 12 if the same product tags 14 have previously traveled through another area as part of a moving group. Further, by comparing historical data, the processor 12 can recognize if more product tags 14 are being added to the moving group over time, which suggests continued shopping activity. The growth of a group, and how it moves through the store with a customer can provided valuable marketing information to the store operator. At checkout the store obtains information on what products are commonly bought together, however, there is no information about what order the products were picked up in. With insight into both what products are bought together but also what order, product placement in the store can be varied to ensure that, for example, for time critical shoppers, the common groupings can be found close together, or products that may be bought as impulse additional purchases can be located in a way that will maximize the chance of a customer seeing them.

In addition to information gathered from the product tags 14 themselves, the processor 12 may factor in information from other sources when determining whether the product tags 14 are part of a moving group. For example, the processor 12 may receive data and/or a signal from a video camera, infrared detector or other data gathering component, which can determine the presence of a shopper in the vicinity of the product tags 14 and verify that any product tags 14 which are being moved through the area are being moved by a shopper, rather than by other means.

Figure 4:
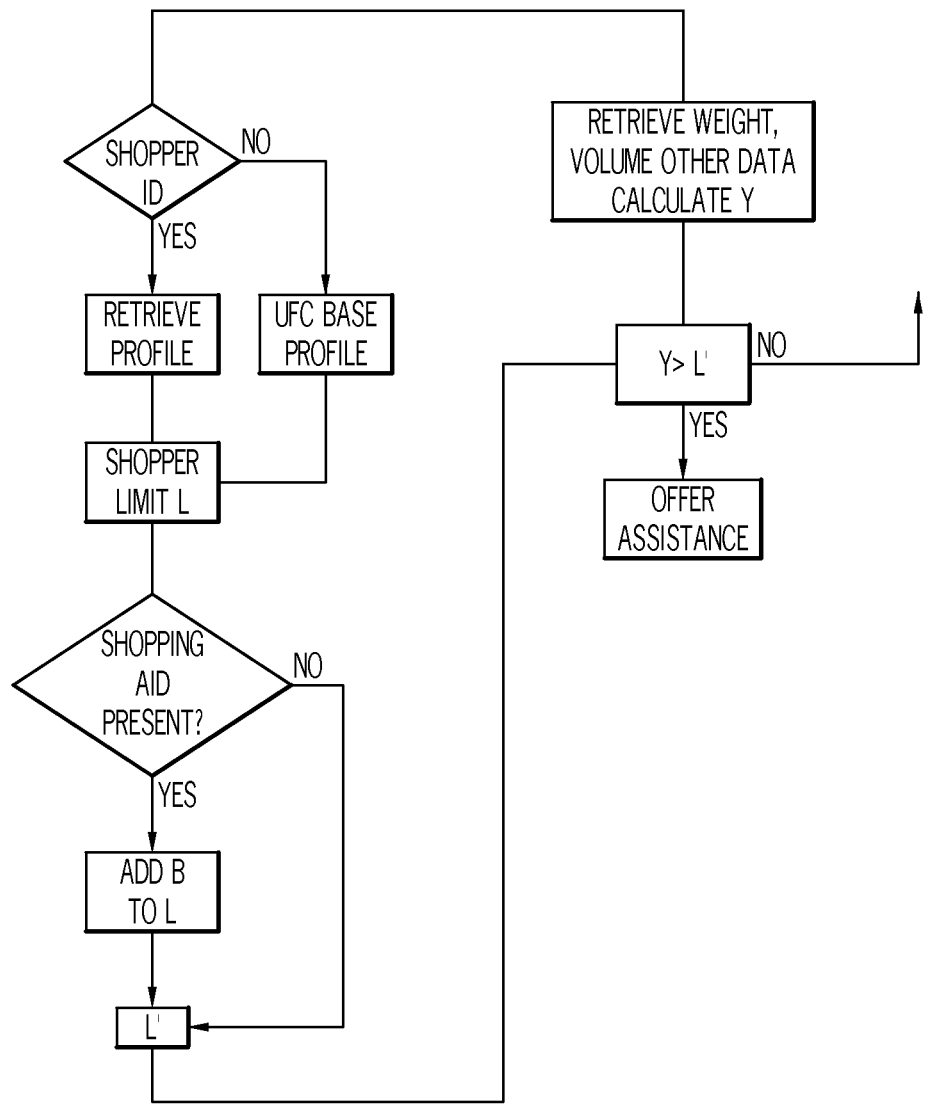
FIG. 4 is a schematic diagram of the control process used by the RFID-based inventory management system of FIG. 1 to generate an output based on the contents of a moving group of RFID-readable tags.
Figure 5:
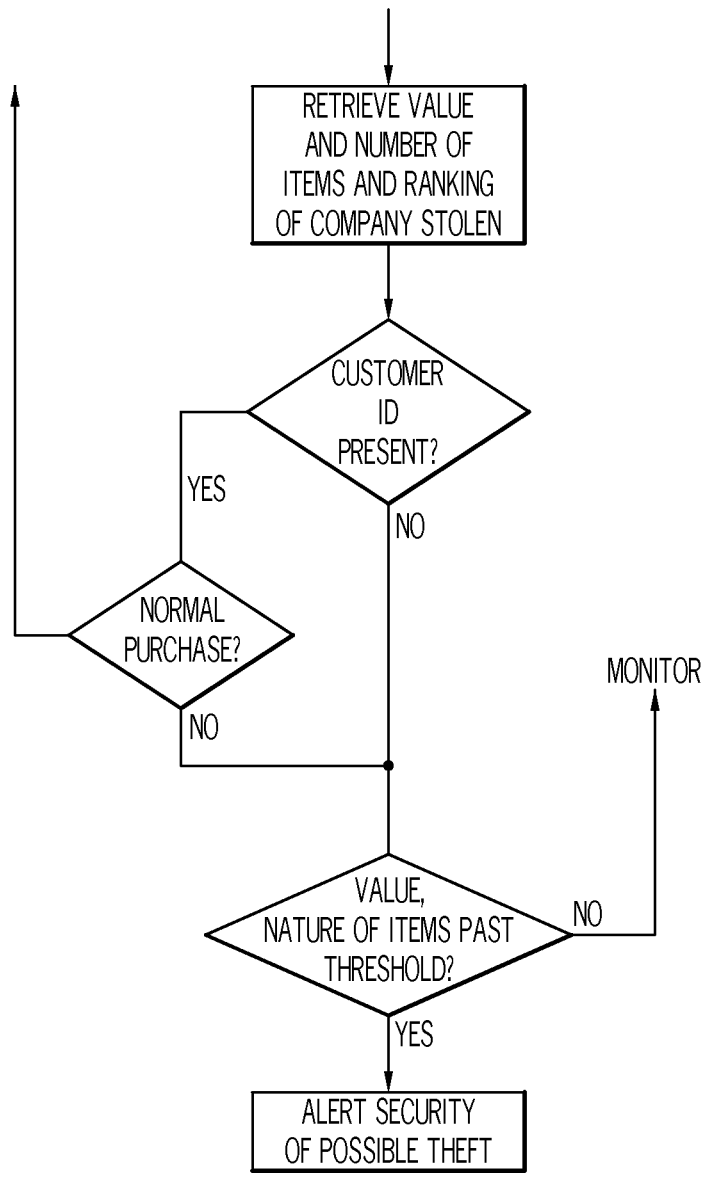
FIG. 5 is a schematic diagram of an alternative control process used by the RFID-based inventory management system of FIG. 1 to generate an output based on the contents of a moving group of RFID-readable tags.

When the processor 12 has determined that a moving group exists, it may generate an output, which depends on the nature of the moving group and the needs of the store. Most commonly, the output is in the form of an alert to provide assistance in the vicinity of the moving group. As used herein, the phrase "provide assistance" is to be construed broadly to mean a wide variety of responses. For example, assistance may be provided in the form of store personnel reporting to the vicinity of the moving group to ascertain whether a shopper needs a cart or basket for carrying heavy or numerous pieces of merchandise 20 or in the form of store personnel dispatched to the vicinity of the moving group to monitor possible theft. Assistance may also be provided in the form of additional remote monitoring or surveillance to assess whether it is necessary to dispatch store personnel to the vicinity of the moving group. FIGS. 4 and 5 illustrate two possible control loops for generating outputs, although other control processes and other outputs may be practiced without departing from the scope of the present disclosure. In the control loop of FIG. 4, the processor 12 has identified a moving group and is determining whether to generate an output. The output would be an alert to dispatch store personnel to the vicinity of the moving group to ask an overloaded shopper if she or he needs assistance, whether in the form of a cart or basket provided by the employee or the employee transporting some or all of the pieces of merchandise 20 (or arranging for another employee to transport some or all of the pieces of merchandise 20) to a designated area while the customer continues shopping. To assess whether the customer is overloaded, the processor 12 assesses one or more characteristics of the pieces of merchandise 20 associated with the product tags 14 in the moving group including, but not limited to, their combined weight, their combined volume, their combined size, and/or the quantity of items. The processor 12 considers one or more of these characteristics and generates a multi-element load value, which is represented in FIG. 4 as Y.

Separately, the processor 12 assesses the ability of the shopper to carry merchandise, which is referred to herein as the "shopper limit" or "carry limit." This may be a predetermined value based on the ability of an average shopper or it may be modified by a number of factors. In the embodiment of FIG. 4, the processor 12 checks whether it has registered a shopper ID. A shopper ID is information encoded into an RFID-readable personal tag which the customer may register for or be assigned and which is carried by the customer. The personal tag may take the form of, for example, a membership or benefit card. The personal tag may be identified by the RFID reader 10 and processor 12 in the same way that the product tags 14 are. If a personal tag is present in or adjacent to the moving group, the processor 12 may retrieve the shopper ID or profile information encoded into the personal tag, which may include a personal "shopper limit" corresponding to that individual shopper's ability to carry merchandise. For example, an elderly shopper may wish to have his "shopper limit" set at a relatively low level so that he is assisted by store personnel at a lower merchandise weight. If the processor 12 does not register a shopper ID, it may use a base profile or standard "shopper limit." The "shopper limit" (whether it is personal to the customer or a default value) is represented in FIG. 4 as L.

The processor 12 may also check whether a shopping aid or assistance device (such as the basket 18 of FIG. 2) is present in or adjacent to the moving group. In the embodiment of FIG. 4, the processor 12 checks whether it has been transmitted, via the RFID reader 10, the signal from an RFID-readable assistance device tag 16 associated with a shopping aid 18. The assistance device tag 16 may either be incorporated into the shopping aid 18 or secured thereto (e.g., by an adhesive or mechanical fastener). If an assistance device tag 16 is present in or adjacent to the moving group, the processor 12 may adjust the shopper limit L by a factor (identified at B in FIG. 4), which represents the ability of a shopper to carry additional items when using a shopping aid 18. The shopper limit L is added to factor B to arrive at an adjusted shopper limit or carry limit represented in FIG. 4 by L'. If no assistance device tag 16 is detected, B will be equal to 0 and L' will be the same as L.

The processor 12 then compares the adjusted shopper limit L' to the load value Y. If the adjusted shopper limit L' is less than the load value Y, it is an indication that the shopper is not overloaded and does not need assistance. On the other hand, if the adjusted shopper limit L' is greater than the load value Y, the processor 12 generates an output in the form of an alert to provide assistance to the shopper.

In the control loop of FIG. 5, the processor 12 has identified a moving group and is determining whether to generate a different output. The control loops of FIGS. 4 and 5 may be practiced separately or together, as can other control loops which generate other outputs. The output generated by the control loop of FIG. 5 is an alert to dispatch security to the vicinity of the moving group to deter possible theft. To assess the likelihood of theft, the processor 12 considers one or more characteristics of the pieces of merchandise 20 associated with the product tags 14 in the moving group including, but not limited to, their combined price and/or their combined frequency of theft, and/or multiple units of substantially the same piece of merchandise, to arrive at a multi-element theft threat value.

The product tags 14 could also be encoded with information such as the expected quantity of the associated piece of merchandise 20, which could be considered by the processor 12 when calculating the theft threat value. For example, some items are expensive and generally not purchased in multiples by a customer. As a specific example, the expected quantity for a particular DVD or videogame disc may be one, because a typical customer would not have use for more than one copy of a given DVD and, if it was found that a moving group contains two or more copies of the same DVD, that may suggest a possible theft. Such a monitoring system may be particularly useful for expensive items which are smaller and portable, as they can be concealed more easily by a thief than an expensive item which is relatively large.

After determining the theft threat value, the processor 12 may either compare the theft threat value to a threshold value or first modify the theft threat value by one or more factors. As in the embodiment of FIG. 4, the processor 12 may check whether it has registered a customer or shopper ID via an RFID-readable personal tag. If a personal tag is present in or adjacent to the moving group, the processor 12 may retrieve the shopper ID or profile information encoded into the personal tag, which may include information which partially or completely negates some or all of the factors which constitute the theft threat value. For example, the personal tag of a customer may indicate that the customer routinely purchases a number of items that fall into a high-theft category. If such items are present in the moving group, the processor 12 may either decrease the theft threat value accordingly or, as illustrated in FIG. 5, set the theft threat value to zero and treat the incident as a normal purchase. Other factors which may modify the theft threat value include whether the moving group is present in a high theft area of the store, such as near the exits.

After any modifications, the processor 12 then compares the theft threat value to a threshold value. If the theft threat value is less than the threshold value, the processor 12 will return to the beginning of the control loop and continue periodically assessing the moving group to determine if the theft threat value ever increases. However, if the theft threat value is greater than the threshold value, the processor 12 generates an output in the form of an alert to dispatch security to intercept or personally monitor the shopper.

As indicated, the outputs and associated control loops of FIGS. 4 and 5 are merely exemplary and other analyses may be performed and other outputs generated by the processor 12 without departing from the scope of the present disclosure. For example, each product tags 14 may be encoded with information related to the category of the associated piece of merchandise 20. If the moving group includes a certain number of items in the same or related categories, an output may be generated to provide assistance to the shopper. For example, if a moving group includes a number of items specific to weddings, a sales associate may be dispatched to assist the shopper with other wedding-related items. In another example, if a moving group includes a number of items which are part of an apparel outfit, a sales associate may be dispatched to assist the shopper with finding other elements of the outfit. This could include elements or products, perhaps even from different departments of the establishment, and which might be considered complementary to the theretofor chosen items.

It will be understood that the embodiments described above are illustrative of some of the applications of the principles of the present subject matter. Numerous modifications may be made by those skilled in the art without departing from the spirit and scope of the claimed subject matter, including those combinations of features that are individually disclosed or claimed herein. For these reasons, the scope hereof is not limited to the above description but is as set forth in the following claims, and it is understood that claims may be directed to the features hereof, including as combinations of features that are individually disclosed or claimed herein.

What is claimed is:

1. An RFID-based inventory management system comprising:
   a plurality of RFID-readable product tags each associated with a piece of merchandise and programmed to generate a signal containing information regarding the associated piece of merchandise;
   an RFID reader capable of sending signals to and receiving signals from said product tags; and
   a processor capable of receiving signals from the RFID reader with information regarding said product tags and programmed to:
      compare the information regarding two or more of said product tags,
      determine whether said two or more product tags are part of a moving group being moved together,
      generate an output based at least in part on the signals being sent from the product tags in the moving group, and
      wherein the processor is programmed with a carry limit corresponding to an ability of a person to carry pieces of merchandise and the output generated by the processor is an alert to provide assistance in a vicinity of the moving group of product tags if the moving group exceeds a carry limit.

2. The RFID-based inventory management system of claim 1, wherein the signals generated by the product tags include information related to a weight of the associated piece of merchandise.

3. The RFID-based inventory management system of claim 2, wherein the output generated by the processor is an alert to provide assistance in the vicinity of the moving group of product tags based at least in part on a combined weight of the pieces of merchandise in the moving group.

4. The RFID-based inventory management system of claim 1, further comprising an RFID-readable personal tag, wherein the personal tag is programmed to generate a signal including information regarding a person and the processor is programmed to determine if the personal tag is part of or adjacent to the moving group.

5. The RFID-based inventory management system of claim 4, wherein the output generated by the processor is based at least in part on a signal from the personal tag.

6. The RFID-based inventory management system of claim 1, wherein the processor is programmed to determine the approximate velocity of movement of one of said pieces of merchandise based at least in part on the signal from the associated product tag.

7. The RFID-based inventory management system of claim 1, wherein the processor is programmed to determine the approximate direction of movement of one of said pieces of merchandise based at least in part on the signal from the associated product tag.

8. An RFID-based inventory management system comprising:
   a plurality of RFID-readable product tags each associated with a piece of merchandise and programmed to generate a signal containing information regarding the associated piece of merchandise;
   an RFID reader capable of sending signals to and receiving signals from said product tags; and
   a processor capable of receiving signals from the RFID reader with information regarding said product tags and programmed to:
      compare the information regarding two or more of said product tags,
      determine whether said two or more product tags are part of a moving group being moved together,
      generate an output based at least in part on the signals being sent from the product tags in the moving group,
   wherein the signals generated by the product tags include information related to a volume of the associated piece of merchandise, and
   wherein the output generated by the processor is an alert to provide assistance in a vicinity of the moving group of product tags based at least in part on a combined volume of the pieces of merchandise in the moving group.

9. An RFID-based inventory management system comprising:
   a plurality of RFID-readable product tags each associated with a piece of merchandise and programmed to generate a signal containing information regarding the associated piece of merchandise;
   an RFID reader capable of sending signals to and receiving signals from said product tags; and
   a processor capable of receiving signals from the RFID reader with information regarding said product tags and programmed to:
      compare the information regarding two or more of said product tags,
      determine whether said two or more product tags are part of a moving group being moved together,
      generate an output based at least in part on the signals being sent from the product tags in the moving group
      the signals generated by the product tags include information related to a size of the associated piece of merchandise, and
   wherein the output generated by the processor is an alert to provide assistance in a vicinity of the moving group of product tags based at least in part on a combined size of the pieces of merchandise in the moving group.

10. An RFID-based inventory management system comprising;
   a plurality of RFID-readable product tags each associated with a piece of merchandise and programmed to generate a signal containing information regarding the piece of merchandise;
   an RFID reader capable of sending signals to and receiving signals from said product tags;
   an assistance device and an RFID-readable assistance device tag associated with the assistance device, wherein a processor is programmed to determine if the assistance device tag is part of or adjacent to a moving group;
   the processor capable of receiving signals from the RFID reader with information regarding said product tags and programmed to:

compare the information regarding two or more of said product tags,
determine whether said two or more product tags are part of a moving group being moved together, and
generate an output based at least in part on the signals being sent from the product tags in the moving group.

11. The RFID-based inventory management system of claim 10, wherein the output generated by the processor is based at least in part on a signal from the assistance device tag.

12. The RFID-based inventory management system of claim 10, wherein
the processor is programmed with a carry limit corresponding to the ability of a person to carry pieces of merchandise;
the output generated by the processor is an alert to provide assistance in a vicinity of the moving group of product tags if the moving group exceeds the carry limit; and
the processor is programmed to modify the carry limit if the assistance device tag is part of or adjacent to the moving group.

13. An RFID-based inventory management system comprising:
a plurality of RFID-readable product tags each associated with a piece of merchandise and programmed to generate a signal containing information regarding the associated piece of merchandise;
an RFID reader capable of sending signals to and receiving signals from said product tags; and
a processor capable of receiving signals from the RFID reader with information regarding said product tags and programmed to:
compare the information regarding two or more of said product tags,
determine whether said two or more product tags are part of a moving group being moved together,
generate an output based at least in part on the signals being sent from the product tags in the moving group, and
the signals generated by the product tags include information related to a category of the associated piece of merchandise, and
wherein the output generated by the processor is an alert to provide assistance in a vicinity of the moving group of product tags if at least a predetermined quantity of the product tags in the moving group have related and/or the same categories.

14. An RFID-based inventory management system comprising:
a plurality of RFID-readable product tags each associated with a piece of merchandise and programmed to generate a signal containing information regarding the associated piece of merchandise;
an RFID reader capable of sending signals to and receiving signals from said product tags; and
a processor capable of receiving signals from the RFID reader with information regarding said product tags and programmed to:
compare the information regarding two or more of said product tags,
determine whether said two or more product tags are part of a moving group being moved together,
generate an output based at least in part on the signals being sent from the product tags in the moving group,
the signals generated by the product tags include information related to a price of the associated piece of merchandise, and
wherein the output generated by the processor is an alert to provide assistance in a vicinity of the moving group of product tags based at least in part on the combined price of the pieces of merchandise in the moving group.

15. An RFID-based inventory management system, comprising:
a plurality of RFID-readable product tags each associated with a piece of merchandise and programmed to generate a signal containing information regarding the associated piece of merchandise;
an RFID reader capable of sending signals to and receiving signals from said product tags; and
a processor capable of receiving signals from the RFID reader with information regarding said product tags and programmed to:
compare the information regarding two or more of said product tags,
determine whether said two or more product tags are part of a moving group being moved together,
generate an output based at least in part on the signals being sent from the product tags in the moving group, and
wherein the signals generated by the product tags include information related to a frequency of theft of the associated piece of merchandise.

16. The RFID-based inventory management system of claim 15, wherein the output generated by the processor is an alert to provide assistance in a vicinity of the moving group of product tags based at least in part on the combined frequency of theft of the pieces of merchandise in the moving group.

17. An RFID-based inventory management, comprising:
a plurality of RFID-readable product tags each associated with a piece of merchandise and programmed to generate a signal containing information regarding the associated piece of merchandise;
an RFID reader capable of sending signals to and receiving signals from said product tags; and
a processor capable of receiving signals from the RFID reader with information regarding said product tags and programmed to:
compare the information regarding two or more of said product tags,
determine whether said two or more product tags are part of a moving group being moved together,
generate an output based at least in part on the signals being sent from the product tags in the moving group, and
wherein the signals generated by the product tags include information related to an expected quantity of the associated piece of merchandise.

18. The RFID-based inventory management system of claim 17, wherein the output generated by the processor is an alert to provide assistance in a vicinity of the moving group of product tags if the quantity of a particular piece of merchandise in the moving group exceeds said expected quantity.

19. An RFID-based method of managing inventory, comprising:
providing a plurality of pieces of merchandise;
providing a plurality of RFID-readable product tags, with each product tag associated with one of said pieces of merchandise and capable of generating a signal containing information regarding the associated piece of merchandise;
receiving signals from two or more of said product tags;
processing the signals from said two or more product tags to determine whether the two or more product tags are part of a moving group being moved together; and generating an output if it is determined that the two or more product tags are part of a moving group
said receiving signals from two or more of said product tags includes receiving signals having information related to a weight of the associated pieces of merchandise, and
wherein said generating an output includes generating an alert to provide assistance in a vicinity of the moving group of product tags based at least in part on a combined weight of the pieces of merchandise in the moving group.

20. The method of claim 19, wherein said receiving signals from two or more of said product tags includes receiving signals having information related to a volume of the associated pieces of merchandise.

21. The method of claim 20, wherein said generating an output includes generating an alert to provide assistance in the vicinity of the moving group of product tags based at least in part on a combined volume of the pieces of merchandise in the moving group.

22. The method of claim 19, wherein said receiving signals from two or more of said product tags includes receiving signals having information related to a size of the associated pieces of merchandise.

23. The method of claim 22, wherein said generating an output includes generating an alert to provide assistance in the vicinity of the moving group of product tags based at least in part on a combined size of the pieces of merchandise in the moving group.

24. The method of claim 19, wherein said generating an output includes generating an alert to provide assistance in the vicinity of the moving group of product tags if the moving group exceeds a carry limit corresponding to a ability of a person to carry pieces of merchandise.

25. The method of claim 19, further comprising providing an RFID-readable personal tag including information regarding a person, wherein said generating an output includes determining if a personal tag is part of or adjacent to the moving group.

26. The method of claim 25, wherein said generating an output includes generating an output based at least in part on a signal from the personal tag.

27. The method of claim 19, wherein said receiving signals from two or more of said product tags includes receiving signals having information related to the categories of the associated pieces of merchandise.

28. The method of claim 27, wherein said generating an output includes generating an alert to provide assistance in the vicinity of the moving group of product tags if at least a predetermined quantity of the product tags in the moving group have related and/or the same categories.

29. The method of claim 19, wherein said receiving signals from two or more of said product tags includes receiving signals having information related to the price of the associated pieces of merchandise.

30. The method of claim 29, wherein said generating an output includes generating an alert to provide assistance in the vicinity of the moving group of product tags based at least in part on a combined price of the pieces of merchandise in the moving group.

31. The method of claim 19, wherein said receiving signals from two or more of said product tags includes receiving signals having information related to a frequency of theft of the associated pieces of merchandise.

32. The method of claim 31, wherein said generating an output includes generating an alert to provide assistance in the vicinity of the moving group of product tags based at least in part on a combined frequency of theft of the pieces of merchandise in the moving group.

33. The method of claim 19, wherein said receiving signals from two or more of said product tags includes receiving signals having information related to an expected quantity of the associated pieces of merchandise.

34. The method of claim 33, said generating an output includes generating an alert to provide assistance in the vicinity of the moving group of product tags if the quantity of a particular piece of merchandise in the moving group exceeds said expected quantity.

35. The method of claim 19, wherein said processing the signals from said two or more product tags includes processing the signals to determine the approximate velocity of movement of said two or more product tags.

36. The method of claim 19, wherein said processing the signals from said two or more product tags includes processing the signals to determine the approximate direction of movement of said two or more product tags.

37. An RFID-based method of managing inventory, comprising:
providing a plurality of pieces of merchandise;
providing a plurality of RFID-readable product tags, with each product tag associated with one of said pieces of merchandise and capable of generating a signal containing information regarding the associated piece of merchandise;
receiving signals from two or more of said product tags;
processing the signals from said two or more product tags to determine whether the two or more product tags are part of a moving group being moved together;
generating an output if it is determined that the two or more product tags are part of a moving group; and
providing an assistance device and an RFID-readable assistance device tag associated with the assistance device, wherein said generating an output includes determining if an assistance device tag is part of or adjacent to the moving group.

38. The method of claim 37, wherein said generating an output includes generating an output based at least in part on a signal from the assistance device tag.

39. The method of claim 37, wherein said generating an output includes generating an alert to provide assistance in the vicinity of the moving group of product tags if the moving group exceeds a carry limit corresponding to a ability of a person to carry pieces of merchandise and the carry limit is modified if an assistance device tag is part of or adjacent to the moving group.

* * * * *